No. 894,980. PATENTED AUG. 4, 1908.
G. M. PHILLIPS.
RUNNING GEAR FOR VEHICLES.
APPLICATION FILED MAY 19, 1906.
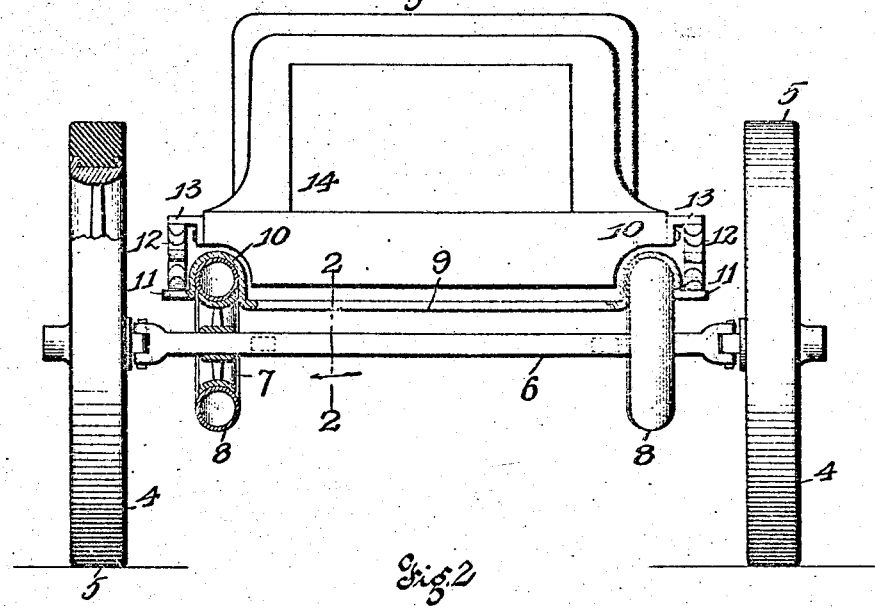
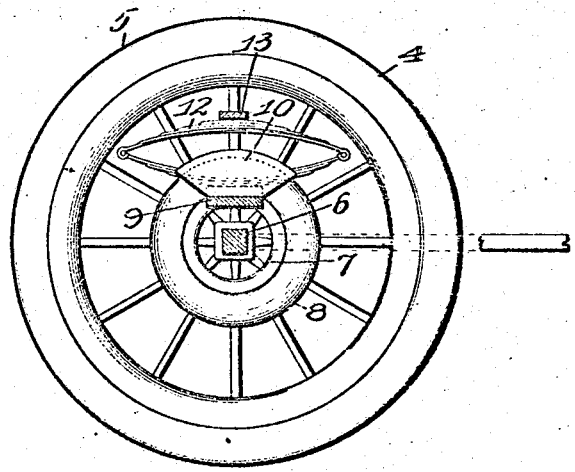
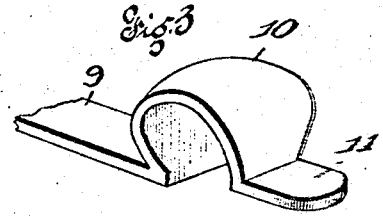
Witnesses
Inventor
George M. Phillips
by Hopkins & Eicks Attys.

UNITED STATES PATENT OFFICE.

GEORGE M. PHILLIPS, OF ST. LOUIS, MISSOURI.

RUNNING-GEAR FOR VEHICLES.

No. 894,980.　　Specification of Letters Patent.　　Patented Aug. 4, 1908.

Application filed May 19, 1906. Serial No. 317,724.

*To all whom it may concern:*

Be it known that I, GEORGE M. PHILLIPS, a citizen of the United States, and resident of St. Louis, Missouri, have invented certain new and useful Improvements in Running-Gear for Vehicles, of which the following is a specification.

This invention relates to improvements in running gear for vehicles, and consists of the novel arrangement, construction and combination of parts as will be fully hereinafter described and claimed.

The object of my invention is to construct a running gear of a vehicle with pneumatic cushions upon which the body of the vehicle is mounted.

A further object of my invention is to provide the axles of a running gear with pneumatic cushions upon which the body of the vehicle is mounted, to provide sufficient spring or resiliency, and to take the place of the pneumatic tires on the wheels of the vehicle.

A further object of my invention is to dispense with the use of pneumatic tires on the wheels and to apply pneumatic cushions on the running gear upon which the body of the vehicle is supported, and to give to the body the same amount of spring or resiliency as would be attained by the use of pneumatic tires.

Figure 1 is a front view of my invention with parts in section, showing the construction of the various parts. Fig. 2 is a central section of the running gear taken on the line 2—2 of Fig. 1. Fig. 3 is a detail, perspective view of one end of the supporting bars by which the body is supported upon the pneumatic cushions.

In the construction of the device as shown, I provide the running gear with suitable wheels 4 provided with solid rubber tires 5 or of any suitable material, and upon the axles 6 of the running gear I place circular cushion frames having concave peripheries 7 on the peripheries of which are mounted circular pneumatic cushions 8. The cushion frames are rigidly mounted upon the axles, and held in nonrevolving position, and over the tops of the cushions 8 are mounted the supporting bars 9. These bars are arranged to extend from cushion to cushion, and parallel to the axles, and are provided with the housing 10, arranged to conform with the shape of the cushions, and the outer ends of the housings are provided with the projecting ears 11, upon which is mounted and supported an ordinary elliptic spring 12. These springs are also connected to a suitable bracket 13 which is attached to the body 14 of the vehicle to support the same.

The entire weight of the body is upon the supporting bars 9, and this weight is distributed upon each of the four cushions supported by the axles. By constructing a vehicle in this manner the use of pneumatic tires together with the wear and tear is dispensed with, and the same resiliency that is accomplished by the use of pneumatic tires is applied to the body by the use of the pneumatic cushions located upon the axle.

It is obvious that the device of my invention may be embodied in any form of frame-structure carried by two or more wheels, and provided with two or more pneumatic cushions, and any form of vehicle body suitably supported upon the pneumatic cushions to the end that the shock resulting from inequality in or obstruction upon the street surface may be taken up by the pneumatic cushions, so that the impact of the shock may be distributed throughout said cushions, and the vehicle body shielded and protected thereby. It is also obvious that the device of my invention may be embodied in any desired form of vehicle whether or not the same is self-propelled.

Having fully described my invention, what I claim is:

In a running gear for vehicles, an axle; circular cushioned frames having concave peripheries; a circular pneumatic cushion mounted in the concave periphery of each of said frames; a supporting bar arranged above and parallel to the axle; housings carried by the supporting bar and concaved to register with the upper surfaces of the pneumatic cushions; projecting ears mounted upon the outer ends of the housing; a vehicle body; and springs upon which the vehicle body is mounted, said springs being supported by said projecting ears, substantially as described.

In testimony whereof, I have signed my name to this specification, in presence of two subscribing witnesses.

GEORGE M. PHILLIPS.

Witnesses:
ALFRED A. EICKS,
WALTER C. STEIN.